United States Patent [19]

Speyer

[11] 3,921,343
[45] Nov. 25, 1975

[54] HOT MELT COMPOSITIONS
[75] Inventor: Fred B. Speyer, Euclid, Ohio
[73] Assignee: TRW Inc., Cleveland, Ohio
[22] Filed: Jan. 25, 1974
[21] Appl. No.: 436,512

[52] U.S. Cl. ................. 51/323; 51/277; 51/21 R; 260/28.5 A; 264/162; 264/259; 264/261; 269/7
[51] Int. Cl.² ................. B24B 19/14; C08L 91/00
[58] Field of Search .......... 264/259, 275, 261, 162; 269/7; 51/290, 216 LP, 277; 260/21 R; 260/28.A, 28.B; 164/112, 334

[56] References Cited
UNITED STATES PATENTS

| | | | |
|---|---|---|---|
| 2,463,065 | 3/1949 | Stevenson | 164/112 |
| 2,527,856 | 10/1950 | Sido et al. | 260/28.5 R |
| 2,606,482 | 8/1952 | Sorensen et al. | 269/7 |
| 3,168,489 | 2/1965 | Brown et al. | 260/21 |
| 3,526,397 | 9/1970 | Verguson | 269/7 |

*Primary Examiner*—Jeffery R. Thurlow
*Attorney, Agent, or Firm*—Hill, Gross, Simpson, Van Santen, Steadman, Chiara & Simpson

[57] ABSTRACT

Thermoplastic resinoid hot melt compositions which find particular utility in the field of fixturing matrices and as pattern materials for producing investment casting molds. The hot melt compositions include, as an essential ingredient, the reaction product of a methylolurea with at least one fatty acid containing from 12 to 20 carbon atoms per molecule.

4 Claims, No Drawings

HOT MELT COMPOSITIONS

BACKGROUND OF THE INVENTION

1. Field of the Invention

This invention is in the field of thermoplastic hot melt compositions which have superior physical properties for casting, encapsulation, extrusion, or injection molding and potting.

2. Description of the Prior Art

Thermoplastic hot melt compositions are commercially used in many applications such as in adhesive bonding, decorative and protective coating, casting, encapsulation, laminating and molding. Such hot melt compositions may include products containing only a single ingredient such as a wax, for example, beeswax, a resin such as rosin or a polymer such as polystyrene or mixtures comprising many combinations of organic materials.

Hot melt compositions have also been used for fixturing matrices and as pattern materials for making molds used for investment casting. When used in these two fields, hot melts require very specific combinations of properties which make them quite distinct from other types of hot melts. Generally, they must have very low melt viscosities at relatively low temperatures nearly coinciding with their softening range.

Heretofore, much of the prior art of matrix fixturing revolves around the use of low melting metal alloys having controlled shrinkage characteristics. These low melting alloys provide a matrix for holding a wide range of metal parts for drilling, grinding, or lapping, milling and turning operations. Certain metal alloys in which bismuth or antimony are incorporated, provide molten metal alloys which expand upon solidification thus providing excellent duplication and reproduction. The use of such alloys is, however, limited in some areas. The weight of these alloys in fixturing large parts poses a processing problem and their high cost provides an expensive inventory problem. Consequently, the loss of any of the alloy during processing is an economic disadvantage. Furthermore, contamination caused by bismuth, cadmium, lead and tin contained in such alloys is extremely damaging in the fixturing of jet engine parts particularly those composed of expensive superalloy materials.

In order for a matrix to function effectively as a fixturing material for jet engine blade work, it has generally been accepted that the matrix material must have certain physical characteristics. For one, the material should have a rigidity approximating that of lead. It should be pourable and have a setup time of about 2 minutes. The shrinkage and cavitation characteristics should be at a minimum. The matrix material must be dimensionally stable for a period of 6 to 8 weeks and provide good adhesion to the blade and matrix box. It must be relatively nontoxic, inexpensive and reusable. It should have a shelf life of over 3 months. It must evidence good cohesion properties when sequentially cast. It must be readily removable without damaging the parts. It should not be appreciably soluble in machining coolants such as high sulfur base oils at temperatures of 140°F. Furthermore, the fixturing material or its residue should not be corrosive to parts or coatings of the jet engine blade up to temperatures of 2000°F.

Equally stringent requirements are present in compositions useful as pattern materials for producing investment casting molds. As is well known in the art, the mold making process involves the use of a disposable pattern which is usually injection molded in a pattern die. After the pattern is formed, it is sequentially coated with successive layers of refractory particles, alternating between layers of very finely divided particles and relatively coarse or stucco layers. After a sufficient number of layers has been built up, the disposable pattern is removed by firing or by steam autoclaving or similar means to leave a relatively rigid but still fairly permeable investment casting mold having a smooth surface.

The selection of a suitable pattern material is of substantial importance in the overall process of investment mold making. Among the many properties which must be considered in any pattern material are:

1. its ash content,
2. the production of a suitable surface finish,
3. resistance to the primary coat, binder and carriers used in the investment slurries,
4. resistance to gum formation in the injection machine,
5. low viscosity, at low melt temperatures,
6. suitable strength, both tensile and impact,
7. a suitable ductile-to-brittle transition temperature range,
8. a suitable solidification temperature range,
9. oxidation resistance,
10. wettability,
11. its weld strength or adhesiveness so that patterns may be joined together and the pattern may be joined to a suitable sprue,
12. suitable coefficients of the thermal expansion, shrinkage, dish, cavitation and dish, cavitation and sink,
13. a suitable hardness,
14. suitable softening temperature, and
15. lack of toxicity.

In addition to the foregoing physical characteristics, for purposes of economy, the pattern material should be reclaimable by ordinary recovering procedures, and must be composed of relatively inexpensive, commercially available materials.

SUMMARY OF THE INVENTION

The present invention provides a hot melt composition including a thermoplastic resinoid designed to meet the requirements for fixturing hard to hold fragile parts during machining and also to meet the requirements for injection molding patterns and sprues used in the manufacture of investment casting molds. The product of the present invention is not, however, limited to these particular applications and can be used in any of the applications common to hot melt technology.

The resinoid ingredient of the compositions of the present invention is the reaction product of a methylolurea with at least one fatty acid containing from 12 to 20 carbon atoms per molecule. The methylolurea is preferably one which has a formaldehyde to urea mol ratio from 1:2 to 3:1. The particularly preferred fatty acids are those containing from 16 to 18 carbon atoms per molecule such as a mixture of palmitic and stearic acids. When used as a fixturing hot melt, the composition also desirably includes a hydrocarbon resin such as a cross-linked polyolefinic resin, one or more vinyl copolymers, a wax of either natural or synthetic origin, and an inorganic filler.

When the compositions of the present invention are used as pattern melts, they are desirably combined with a toughening agent such as ethyl cellulose and a natural or synthetic wax.

DESCRIPTION OF THE PREFERRED EMBODIMENTS

The chemistry of urea-formaldehyde condensation products has been extensively studied over the years. Two crystalline compounds, monomethylolurea and dimethylolurea have been isolated from the reaction of urea with formaldehyde in an alkaline solution. Under alkaline conditions, monomethylolurea forms, upon heating, water-soluble condensation products. With dimethylolurea, cross-linking occurs and an insoluble, infusible product is obtained. In the condensation of the present invention, the urea-formaldehyde condensation reaction is arrested by esterification with a fatty acid to provide a rigid solid at room temperature which can be readily melt-flowed at elevated temperatures. The properties of this resinoid reaction product can be altered to give specifically designated properties by combining them with resinous and/or waxy type materials and by the addition of filler type materials. The reaction can be facilitated by the use of certain resins which when molten at elevated temperatures act as a compatible solvent, wherein the chemical reactants are chain terminated prior to excessive cross-linking and resultant thermosetting.

The basic resinoid can be prepared by adding to a liquid or molten fatty acid (preferably in a molten solvating media) a quantity of urea which is then heat reacted with formaldehyde. Thermosetting condensation polymerization is blocked by esterification of the methylol group with the fatty acid as well as by using a formaldehyde to urea mol ratio of from 1:2 to 3:1 and preferably using equimolar ratios of the two.

For both fixturing and pattern melts, a preferred formulation contains the following ingredients:

| | | |
|---|---|---|
| Fatty acids | 20–100 | parts by weight |
| Formaldehyde (100%) | 10–30 | do. |
| Urea | 20–40 | do. |

While various types of formaldehyde solutions can be used in the preparation of the resinoid of the present invention, it has been found most practical to introduce as few volatiles such as water, alcohol or the like as possible, and to this extent a commercial concentrate such as that known as "UF concentrate 85" has been found to be most useful. This material is a clear, colorless slightly viscous liquid composed of 60% formaldehyde and 25% urea in a 4.8 to 1.0 mol ratio. It is relatively nonvolatile, having a vapor pressure lower than that of normally used formaldehyde solutions at corresponding temperatures. It behaves like a mixture of methylolureas and formaldehyde and contains no resinified material.

Additional urea is introduced into the concentrate to the extent of blocking the formation of the thermosetting dimethylolurea polymerization. Any low ash urea may be used, such as that in micro-prill form. Micro-prills can be stored without lumping together at high humidities and are also fine enough so as to solubilize readily into the formaldehyde-urea concentrate. The addition of a small amount of water to the micro-prills prior to their addition to the concentrate reduces the solvation time. In the particularly preferred formulation, as previously noted, the mol ratio of formaldehyde to urea is approximately 1:1. This condition causes the predominant formation of monomethylolurea. Any dimethylolurea formation can be stabilized by maintaining a basic pH and it is accordingly recommended that minor amounts of an alkaline promoting agent such as triethylolamine be added to prolong the stability of the urea-formaldehyde solution prior to its incorporation into the fatty acid containing melt. The addition of alcohol such as methyl alcohol also extends the stability time.

The extent of polymerization is influenced by the reactivity of the fatty acid with the urea-formaldehyde reaction product. Although many types of fatty acids can be used, it is particularly preferred to use saturated fatty acids such as 16 to 18 carbon atom acids (stearic or palmitic) or mixtures thereof. Binary mixtures of stearic or palmitic acids containing only small quantities of other fatty acids can be used to provide ranges of shrinkage, titer, specific gravity and hardness. Both fixturing melts and pattern melts require predetermined shrink properties. A preferred formulation for pattern melts consists in using a binary mixture of approximately 80% by weight stearic acid to 20% by weight of palmitic acid. For fixturing melts, the corresponding preferred ratio of stearic to palmitic acids is 40 to 60. In either case, it is desirable to use about 4 mols of the monomethylolurea to 1 mol of fatty acids, such as the aforementioned mixture of stearic and palmitic acids.

The low melt viscosity and good mechanical strength characteristics are provided in the resinoid composition by compounding, using resinous, polymeric and/or wax-type additives. The fixturing melts are most benefited by the addition of hard waxes and resins, flexible polymers, and inorganic fillers. The pattern melts are most benefited by the addition of cellulosic derivatives and petroleum waxes.

Suitable hydrocarbon resins include materials such as rosin, rosin esters, phenolics, terpene-phenolics, polyindenes, coumarone-indenes, alkyds and the like. Flexible polymers suitable for use in the melt include materials such as polyvinyl acetate and styrene-butadiene polymers. Suitable waxes are materials such as candelilla, some paraffinic and microcrystalline waxes, amide waxes such as fatty acid amides, diamides and their substitution products, and glycol and glycerol hydroxy stearate waxes. Where high temperature contamination is not a problem, silica can be added as a filler.

In the case of pattern melts, one can employ fatty alcohols and hydroxystearic acid in place of or in addition to the fatty acids. In addition to the preferred ethyl cellulose, cellulosic derivatives such as hydroxypropyl cellulose can also be used. The wax constituent of the pattern melt may contain paraffinic and microcrystalline waxes, as well as most hydrocarbon soluble synthetic and natural waxes.

In the case of the fixturing melts, I particularly prefer to employ, for every 100 parts by weight of the resinoid, the following:
  50–150 parts of a hydrocarbon resin (e.g., cross-linked polyolefinic)
  5–20 parts of a flexible polymer
  10–40 parts wax
  50–350 parts inorganic filler
In the case of the pattern melts, the following proportions are recommended in conjunction with 100 parts by weight of the resinoid:
  1–15 parts cellulosic derivative (e.g., ethyl cellulose)

1–40 parts wax

The following specific examples illustrate formulations produced according to the present invention.

EXAMPLE 1

A fixturing melt composition was made up by means of four fractions. The first fraction contained 85 parts by weight of fatty acids and 110 parts by weight of a hydrocarbon resin. The fatty acids consisted of a mixture of approximately 53% palmitic, 42% stearic, 2.5% myristic, 2.0% margaric and 0.5% pentadecanoic. The hydrocarbon resin was one derived from the polymerization of olefinic fractions derived from petroleum cracking, wherein the olefinic bonds were nearly eliminated by cross-linkage during polymerization. The resin had a ball and ring softening point of 140°C, a melt viscosity of 1 poise at 222°C and an iodine number of 33.

The first fraction was made up by melting the ingredients together approximately 350°F. The first fraction was combined with a second fraction containing 20 parts by weight urea, 10 parts by weight of methyl alcohol, 30 parts by weight of the aforementioned "UF-85" concentrate, and 5 parts by weight of triethanolamine. The second fraction was made up at room temperature and was combined with the fatty acid hydrocarbon resin fraction at temperatures ranging from 300° to 250°F.

A third fraction consisted of a mixture of 10 parts by weight of a vinyl polymer and 30 parts by weight of wax. The particular polymer was a copolymer of ethylene and vinyl acetate containing 18% vinyl acetate and having a melt index of 500 grams flow per 10 minutes, a ball and ring softening point of 190°F, a shore hardness of 79, a tensile strength of 420 psi and an elastic modulus of 2000 psi. The wax employed was a hard wax such as glyceryl-tri-12-hydroxystearate having a melting point of 87°C and a melt viscosity of 0.24 poise at 200°F. This third fraction was combined with the previously blended fractions at a temperature of about 250°F.

The fourth fraction consisted of a filler material which was tabular alumina of a particle size of less than 325 mesh in an amount of 265 parts by weight. Where high temperature metal contamination is not a problem, other fillers such as precipitated calcium carbonate may be used at a similar particle size. The inorganic filler fraction was added at temperatures of about 250° to 200°F, and the entire melt was allowed to solidify.

The casting temperature of the melt was between 170° to 180°F. Changes in the type and proportion of ingredients can, of course, alter the properties and the poured temperature.

EXAMPLE 2

This formulation was intended for use as a pattern melt. A first fraction was made up containing 40 parts by weight fatty acids and 10 parts by weight ethyl cellulose, the ingredients being combined at a temperature of about 300°F. The particular fatty acid mixture was selected so as to impart a shrinkage which was consistent with that of the production dies. The fatty acid mixture contained about 75% stearic, 23% palmitic and 2% myristic acids.

The ethyl cellulose provides toughening of the pattern and also has been shown to prevent phase separation of water soluble and non-water soluble ingredients during the initial stages of urea-formaldehyde condensation. The preferred ethyl cellulose has an ethoxyl content between 47.5 and 49.0%. The degree of ethoxyl group substitution per anhydroglucose unit is between 2.42 and 2.53. A low viscosity ethyl cellulose is particularly preferred. The addition of antioxidants may be used to prevent deterioration of ethyl cellulose containing hot melts when maintained at elevated temperatures. One such antioxidant is BHT (2,6-ditertiary butyl paracresol).

To this first fraction was added a second fraction containing 25 parts by weight of urea and 30 parts by weight of the concentrate "UF 85". This fraction may also contain small amounts of water, methanol, or alkaline catalysts. The concentrate was added to the urea at room temperature and combined with the first fraction at a temperature of about 200° to 300°F to initiate the condensation reaction.

Finally, wax in the amount of 25 parts by weight was added at a temperature of 300° to 200°F. Any wax can be used for this formulation that is compatible with hydrocarbons. The particular wax employed in this example contained alpha olefins produced by the Ziegler polymerization of high purity ethylene. This particular type of wax had a maximum of 28% hydrocarbon chains with 28 or less carbon atoms and a minimum of 72% chains of 30 or more carbon atom groups. The melting point range of this 30 carbon atom and up fraction was between 145° and 165°F. The viscosity at 210°F ranged from 8.0 to 10.0 centistokes, and the material had a flash point of 510°F.

EXAMPLE 2

The pattern properties of a formulation produced according to this example are given in the following table:

| | |
|---|---|
| Ball and ring softening point | 144°F |
| Hardness needle penetrometer 450g./5 sec./77°F | 0.7mm |
| Deflection(5 × 1 × ⅛" Bar)400g./ 10 sec./77°F | 0.008in. |
| Sag (8 × 1 × ⅛" bar)0g./48 hrs./77°F | 0.012in. |
| Stress rupture (5 × 1 × ¼" bar) 3" span/.005"/sec. | 15 lbs. |

EXAMPLE 3

A fixturing melt was made up having a pour temperature of 230° to 260°F. The first fraction consisted of 85 parts by weight of fatty acids and 130 parts by weight of a hydrocarbon resin. The second fraction contained 20 parts by weight urea, 10 parts by weight of a water-methanol solution, 30 parts of "UF-85" and 5 parts of triethanolamine. The third fraction consisted of 20 parts by weight of an ethylene-vinyl acetate copolymer. A fourth fraction consisted of 310 parts by weight of aluminum oxide powder. These four fractions were combined as in the previous examples to produce a satisfactory fixturing melt.

EXAMPLE 4

A pattern melt was made up from two fractions, the first containing 80 parts by weight fatty acids and 40 parts by weight hydrocarbon resin. The second fraction contained 20 parts by weight of urea, 10 parts by weight of a water-methanol solution, 30 parts by weight of "UF-85" and 5 parts by weight of triethanol amine. The two fractions were combined to form a pattern material which was eminently suitable for injection molding.

It will be understood that the hot melt compositions of the present invention when used as fixturing materials are used in the conventional way in that they are applied as a molten composition to cover selected areas of the device which has been previously fixtured into a metal matrix box, the solidified melt immobilizing the device within the matrix box so as to protect it during subsequent mechanical processing.

It should also be evident that various modifications can be made to the described embodiments without departing from the scope of the present invention.

I claim as my invention:

1. The method of fixturing a device for subsequent mechanical processing which comprises supporting said device in a holder, applying a molten fixturing composition onto at least portions of said device while so held, said composition comprising the reaction product of a methylolurea with at least one saturated fatty acid containing from 12 to 20 carbon atoms per molecule, said monomethylol urea having a molar ratio of formaldehyde to urea of 1:2 to 3:1, said reaction product being a rigid solid at room temperature but being readily melt-flowed at elevated temperatures, together with a hard wax, a hydrocarbon resin, a flexible polymer and an inorganic filler, and solidifying said composition about said device.

2. The method of claim 1 in which said fixturing composition contains for every 100 parts by weight of said reaction product, from 50 to 150 parts of hydrocarbon resin, from 5 to 20 parts of flexible polymer, from 10 to 40 parts of wax and from 50 to 350 parts inorganic filler.

3. The method of claim 1 in which said fatty acid contains from 16 to 18 carbon atoms per molecule.

4. The method of claim 1 in which said hydrocarbon resin is a cross-linked polyolefinic resin.

* * * * *